United States Patent Office 2,832,797
Patented Apr. 29, 1958

2,832,797

PROCESS FOR THE PRODUCTION OF β-METHYL-GLUTACONIC ACID DINITRILE

Peter Kurtz, Leverkusen-Bayerwerk, Germany, assignor to Farbenfabriken Bayer Aktiengesellschaft, Leverkusen, Germany, a corporation of Germany No Drawing. Application June 29, 1955
Serial No. 518,957

Claims priority, application Germany June 29, 1954

2 Claims. (Cl. 260—465.8)

This invention relates to β-methyl-glutaconic acid dinitrile and to a process for producing the same.

It is an object of the present invention to provide a novel process for the production of β-methyl-glutaconic acid dinitrile. Other objects will appear hereinafter.

These objects are attained in accordance with the present invention by treating β-methylene-glutaric acid dinitrile in an inert diluent with small amounts of alkaline reacting compounds for a short period of time at temperatures below 80° C.

As diluent in which the process of the invention may be carried out, there may be used those diluents which do not react with the compounds applied in the process of the invention, for example ethanol and aqueous ethanol. Benzene has proved to be especially suited.

Suitable alkaline compounds are, e. g., the alkali metal hydroxides, the alkali metal alcoholates and phenolates, and amines of sufficient basicity as, for example, piperidine. These compounds are added in general in amounts of about 0.2 to 2 mol percent calculated on β-methylene-glutaric acid dinitrile, even though other quantities are effective and may be used occasionally with advantage.

In practicing the process of the invention, the reaction mixture is slightly warmed to start the reaction. Since the reaction proceeds under evolution of heat, care has to be taken that the reaction temperature does not exceed 80° C. Furthermore, the reaction should be finished within about 10 minutes, since otherwise the β-methylene-glutaric acid dinitrile and the β-methyl-glutaconic acid dinitrile formed are dimerized.

The β-methyl-glutaconic acid dinitrile can be used as intermediate compound, e. g. upon saponification and esterification in the process of British patent specification No. 722,911.

The following examples further illustrate the invention without, in any way, limiting it.

*Example 1*

500 grams of β-methylene-glutaric acid dinitrile (M. P. 49 to 50° C.) are dissolved in 600 cc. of dry benzene. Upon addition of 0.5 gram of phenol, the mixture is warmed to 36° C. and then 3 grams of sodium phenolate are added. The reaction proceeds under evolution of heat while the temperature of the reaction mixture rises to 71° C. As soon as the temperature drops, the reaction mixture is cooled. Upon filtration, the solution is washed with 200 cc. of dilute hydrochloric acid and subsequently with water. Then the reaction mixture is dried over sodium sulfate, the benzene evaporated and the residue fractionated. Thus, β-methyl-glutaconic acid dinitrile is obtained. B. P. 81 to 89° C./0.005 mm. $n_D^{20}=1.4738$. Yield: 427.5 grams=85% of the theoretical.

Furthermore, a residue of 56.5 grams of a viscous resin is obtained.

*Example 2*

In a series of experiments each time 10 grams of β-methylene-glutaric acid dinitrile are dissolved in 10 cc. of a diluent (benzene, ethanol or aqueous ethanol) and the mixture warmed up to about 40° C. Then, 1/50 mol of an alkaline catalyst is added and the reaction temperature determined to which the mixture is heated. As soon as the temperature drops, the reaction mixture is cooled. If benzene is used as diluent, the solution is washed with slightly acid water, dried over sodium sulfate, the benzene evaporated and the residue fractionated. If alcohol is used as diluent, slightly acidified water is added, the precipitated oil extracted with ether, the ethereal solution dried over sodium sulfate, the ether evaporated and the residue fractionated.

The results are given in the following table.

$$CH_2=C\begin{matrix}CH_2CN\\\\CH_2CN\end{matrix} \longrightarrow CH_3-C\begin{matrix}CH-CN\\\\CH_2-CN\end{matrix}$$

| Assay No. | Solvent Mixture | Catalyst | Raise of Temperature, °C. | Reaction Product B. P. | Reaction Product grams | $n_D^{20}$ | Residue of the Distillation |
|---|---|---|---|---|---|---|---|
| 1 | benzene | 0.2 g. 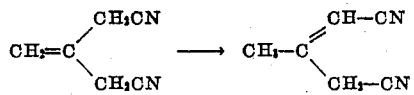—ONa | 41–64 | 124–130° C./11 | 8.4 | 1.4732 | 0.6 gram resin. |
| 2 | do | 0.14 g. pyridine | [1] none | | | | |
| 3 | do | 0.14 g. pyridine | [2] none | | | | |
| 4 | do | 0.17 g. piperidine | 40–52 | 125–131° C./10 | 9.8 | 1.4733 | residue 0.2 gram. |
| 5 | ethanol | 0.2 g. ⬡—ONa | 39–53 | 124–130° C./10 | 6.9 | 1.4740 | 2.3 grams resin. |
| 6 | do | 0.1 g. CH₃-O-Na | 43–60 | 127–138° C./12 | 6.3 | 1.4725 | 1.6 grams resin. |
| 7 | do | 0.11 g. KCN | [3] none | 125–136° C./10 | 4.5 | 1.4733 | |
| 8 | ethanol+H₂O 4:1 | 0.1 g. KOH. | 43–56 | 125–130° C./10 | 6.5 | 1.4723 | 2.3 grams resin. |

[1] Heated for 10 minutes to 80° C.; starting material recovered=10.0 grams.
[2] Heated for 5 hours to 80° C.; starting material recovered=9.9 grams.
[3] Heated for 10 minutes to 80° C.; residue=4.3 grams resin.

I claim:

1. Process for the production of β-methyl-glutaconic acid dinitrile which comprises treating β-methylene glutaric acid dinitrile in an inert diluent with an alkaline reacting compound which is selected from the group consisting of the alkali metal hydroxides, the alkali metal alcoholates and the alkali metal phenolates and piperidine for a short period of time at temperatures below 80° C. and recovering the β-methyl-glutaconic acid dinitrile formed.

2. A process as claimed in claim 1, in which a member selected from the group consisting of benzene, ethanol and aqueous ethanol is used as inert diluent.

References Cited in the file of this patent

FOREIGN PATENTS 702,275   Great Britain _____ Jan. 13, 1954